United States Patent
Risen, Jr.

(10) Patent No.: US 6,758,639 B2
(45) Date of Patent: Jul. 6, 2004

(54) BIT FOR CUTTING DRYWALL

(75) Inventor: Carl W. Risen, Jr., Louisville, KY (US)

(73) Assignee: Credo Technology Corporation, Wilmington, DE (US)

( * ) Notice: Subject to any disclaimer, the term of this patent is extended or adjusted under 35 U.S.C. 154(b) by 144 days.

(21) Appl. No.: 10/072,322

(22) Filed: Feb. 7, 2002

(65) Prior Publication Data

US 2003/0147711 A1 Aug. 7, 2003

(51) Int. Cl.$^7$ ................................................ B23C 5/10
(52) U.S. Cl. ........................................ 408/199; 407/53
(58) Field of Search ..................... 407/53, 54; 144/221, 144/241, 240; 408/230, 30, 199

(56) References Cited

U.S. PATENT DOCUMENTS

| | | | |
|---|---|---|---|
| 190,307 A | | 5/1877 | Goddard |
| 258,390 A | | 5/1882 | Dudley |
| 362,934 A | | 5/1887 | Champion |
| 1,907,880 A | * | 5/1933 | Royle ........................... 407/54 |
| 2,623,552 A | | 12/1952 | Compton et al. |
| 2,887,136 A | | 5/1959 | Rathgeber |
| 2,905,059 A | * | 9/1959 | Fabish .......................... 407/44 |
| 3,701,188 A | | 10/1972 | Wall et al. |
| 4,231,693 A | | 11/1980 | Kammeraad |
| 4,572,714 A | * | 2/1986 | Suzuki et al. ................ 408/230 |
| 5,143,490 A | | 9/1992 | Kopras |
| 5,323,823 A | | 6/1994 | Kopras |
| 5,921,728 A | | 7/1999 | Kammeraad et al. |

FOREIGN PATENT DOCUMENTS

| | | | | |
|---|---|---|---|---|
| DE | 289231 | * | 4/1991 | ................... 407/53 |
| FR | 1447076 | * | 6/1966 | ................... 407/53 |

* cited by examiner

*Primary Examiner*—Daniel W. Howell
(74) *Attorney, Agent, or Firm*—Maginot Moore & Beck

(57) ABSTRACT

A drywall routing bit for cutting laterally in a drywall or sheetrock panel includes an elongated body terminating at one end in a tip for penetrating the panel. The bit includes a single helical flute which defines a cutting edge at a helix angle relative to said longitudinal axis of the bit of 36°–38°. The cutting edge of the flute is defined at a rake angle of 20°–26°. The fluted portion of the bit has a web thickness that is 60%–63% of the bit outer diameter, for a ⅛" diameter bit. The tip of the bit includes angled chisel edges subtending an angle of 113°–123° and following a shallow S-shaped curvature relative to a plane including the subtended angle.

14 Claims, 2 Drawing Sheets

BIT FOR CUTTING DRYWALL

BACKGROUND OF THE INVENTION

The present invention relates to a tool-driven bit, such as a router bit. More specifically, the invention concerns a bit for cutting drywall.

In the construction industry, drywall, or sheetrock, is commonly used to cover large wall areas. In a typical practice, a large drywall panel is placed over wall studs and covering typical aperture locations in the wall, such as electrical boxes, windows and doors. Once the drywall is at least temporarily in place, openings at these preferred aperture locations are cut in the drywall. This approach has been found to save substantial time in comparison to precutting the panel to fit or to form a particular opening before mounting the drywall panel to the wall studs.

Special tool bits have been developed for performing such cutting operations. In particular, the bit must be capable of first axially penetrating the drywall panel, and then making a lateral cut in the panel. The typical tool, a router, operates at speeds in the neighborhood of 20,000–30,000 rpm. The drywall bit can be used first to drill through the panel directly adjacent to an electrical outlet box, for instance. The bit is then conveyed in a direction perpendicular to the length of the bit, following the contour of the outlet box. The router is then manipulated to completely encircle the outlet box to cut the preferred opening in the drywall panel.

One important factor in the design of a bit for cutting drywall is the bit diameter. Early drywall bits had a fairly large diameter, often as much as one-quarter inch (¼"). Obviously, the larger the diameter of the bit, the wider the kerf or slot formed by the router cut. On the other hand, the larger diameter of the bit, the stronger it is, so that it will more readily resist breakage. However, the kerf width is especially important when cutting around an outlet box, for instance. Since the outlet box is ultimately covered by a cover or switch plate, it is preferable that the cut around the box be as narrow as possible. In many cases, a one-quarter inch (¼") slot around the perimeter of the outlet box is too large to be easily concealed by the outlet cover plate. Moreover, the width of the slot depends on the accuracy of the router operator in following the contour of the outlet box. Certainly, in some cases the slot cut in the drywall panel may move away from direct contact with the perimeter of the outlet box, which increases the area which must be overlapped by the cover plate.

In order to address this problem, drywall router bits were developed in diameters as small as one eight inch (⅛"). However, smaller router bits are susceptible to breakage under typical operating speeds and conditions. In order to increase the life of these smaller diameter bits, the rotational speed of the bits can be reduced. In addition, the travel speed or the cutting speed of the bit can be reduced. Of course, any reduction in cutting speed makes the drywall panel preparation process more labor intensive and ultimately more expensive.

Another problem associated with smaller diameter router bits is the noise generated by the high speed rotating bit. With many prior drywall router bits, the noise level can reach well over 100 dBA in the area occupied by the router operator. Beyond the decimal level itself, the frequency of the noise of these prior drywall bits can fall around 1500 hz, which is within the aural pain region for many drywall hangers.

Consequently, there remains a need for a drywall router bit that can optimize these strength, speed and noise considerations.

SUMMARY OF INVENTION

In order to address these needs, the present invention provides a router-type bit for cutting drywall or sheetrock that includes a single helical flute having a particular geometry. In one embodiment of the invention, the flute defines a cutting edge at a helix angle relative to the longitudinal axis of the bit. The helix angle is limited to a range of 36°–38°.

In another feature, the cutting edge of the flute is situated at a particular rake angle relative to the axis of the bit. In this feature, the rake angle is limited to a range of 20°–26°. In the preferred embodiment, the fluted portion of the bit has a web thickness that is between 60%–63% of the cutting diameter of the bit. In a specific embodiment, the cutting diameter of the bit is ⅛", or 0.0125", and the web thickness is limited to 0.075"–0.079".

In certain embodiments, the bit is configured for making an axial cut through a drywall panel. Thus, the bit includes a tip configured to perform an axial cut. In one feature of the invention, the tip includes angled chisel edges that subtend an angle of 113°–123°. Moreover, the chisel edges follow a shallow S-shaped curvature relative to a plane containing the subtended angle. Where the bit is intended for cutting around the perimeter of an electrical outlet box, for instance, the bit can include an un-fluted portion or band between the helical flute and the cutting tip of the bit.

It is one object of the present invention to provide a router-type bit for making axial and lateral cuts in drywall or sheetrock. A further object is accomplished by features that provide an optimum combination of maximized linear cutting speed, reduced noise and acceptable strength/wear characteristics.

Yet another object is to provide a drywall bit that produces the cleanest cut possible, including through the backing paper of the drywall. Other objects and specific benefits of the present invention can be appreciated upon consideration of the following written description and accompanying figures.

DESCRIPTION OF THE PREFERRED EMBODIMENTS

Figure 1:
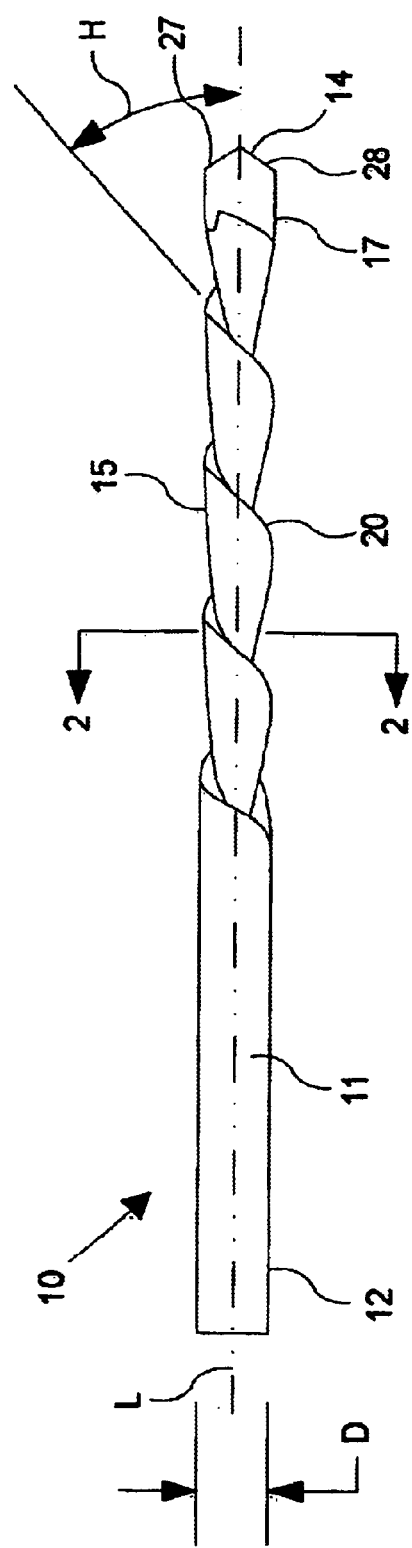
FIG. 1 is a top elevational view of a drywall router bit according to one embodiment of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

In the preferred embodiment of the invention, a router bit 10, as shown in FIG. 1 includes an elongated body 11 or shank. One end of the body forms a tool-engaging portion 12 that is preferably configured for gripping within the chuck of a router tool. The opposite end of the body 11 terminates in a tip 14. In the preferred embodiment, the tip 14 is configured as a drilling tip—i.e., for axial movement through a panel of drywall.

In one feature of this embodiment, the bit 10 is provided with a single helical flute 15 that spans from the tool-engaging portion 12 toward the tip 14 of the bit. In a most preferred embodiment, the body further defines an un-fluted band 17 between the helical flute 15 and the tip. This unfluted band 17 provides a continuous circumferential surface for contacting an outlet box, for instance, as the bit is routed around the box. The band helps protect the flute from being abraded by contact with the outlet box, and helps preserve the rotational and cutting speed of the router bit 10.

Figure 2:
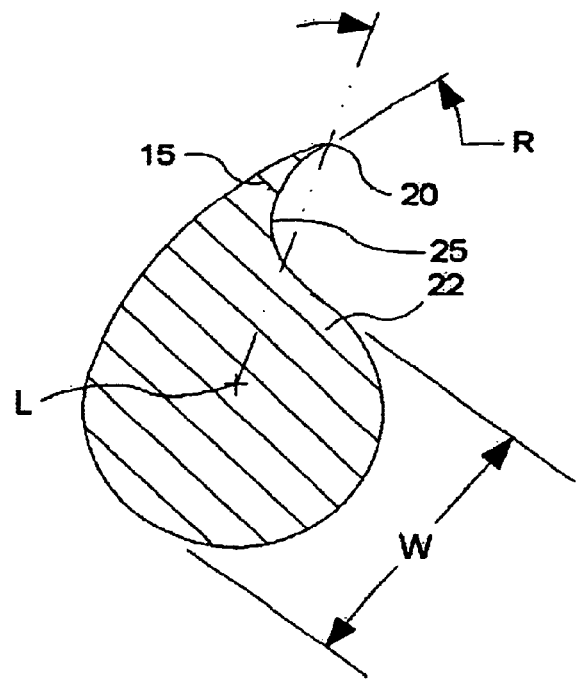
FIG. 2 a cross-sectional view of the drywall router bit shown in FIG. 1, taken along line 2—2 as viewed in the direction of the arrows.

As shown in more detail in the cross-sectional view of FIG. 2, the flute 15 terminates in a cutting edge 20 that performs the routing or lateral cut operation of the bit. The flute 15 projects from the web 22 which extends along the length of the helical flute 15. In addition, the flute 15 and web 22 define a gullet 25 inboard of the cutting edge 20. The gullet 25 receives the drywall material as it is cut or routed by the cutting edge 20. In addition, the helical pattern formed by the gullet 25 helps convey the drywall material away from the cut as the bit is operated.

Figure 3:
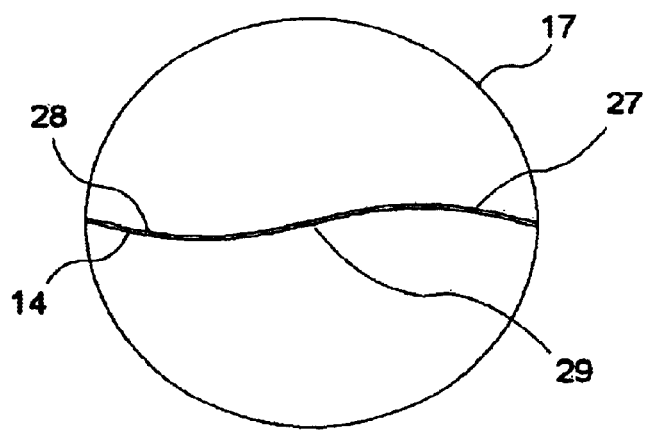
FIG. 3 is an end elevational view of the drywall bit shown in FIG. 1.

In one preferred embodiment, the tip 14 is configured to make an axial cut into the drywall panel. Thus, the tip 14 can include a pair of angled chisel edges 27 and 28 that converge at a point 29, as best seen in FIG. 3. In one specific embodiment, the chisel edges 27 and 28 subtend an angle of between 113°–123°, and most preferably about 118°. Moreover, as shown in FIG. 3, the chisel edges 27 and 28 form a shallow S-shaped curvature when viewed end on. In other words, the edges follow this S-shaped curve relative to a plane including the angle subtended by the two edges.

It has been found that this point geometry penetrates axially into the drywall more easily under the weight of the router tool alone. In other words, the shallow S-shaped curvature of the chisel edges 27 and 28 makes the axial cut easier without the operator having to exert a significant amount of pushing force to push the bit 10 through the drywall. Ultimately, this increases the speed and efficiency of the cut, and makes a cleaner cut because the drywall material is penetrated in a cutting, rather than a pushing, action. Moreover, the more efficient axial penetration of the drywall reduces the heat build up experienced by the tip 14 of the bit 10, which ultimately increases the life of the bit.

In another aspect of the preferred embodiment of the invention, the flute 15 defines a particular geometry. Specially, in one aspect, the helical flute 15 forms a helix angle H (FIG. 1) relative to the longitudinal axis L of the bit 10. In accordance with the present invention, this helix angle H falls in the range of 36°–38°. One surprising result of this helix angle H is that the bit 10 provides the cleanest possible cut at the highest possible cut speed. One problem associated with prior drywall bits is that the outer paper layer on the drywall has a tendency to sheer or bunch. Prior bits having a much lower helix angle are ineffective at cutting or shaving the top paper layer of the drywall. Instead, the paper layer tends to be frayed by these prior bits, leaving a visible fuzzy edge to the cut. On the other hand, prior drywall bits having a much higher helix angle have suffered from being clogged with drywall dust once the bit cuts through the additional paper layer of the drywall. With this feature of the present invention, it has been found that the helix angle H within a range of 36°–38° provides a clean cut or shaving of the top paper layer, without clogging the bit with drywall dust during a routing operation.

In another feature of the most preferred embodiment of the invention, the flute 15 defines a rake angle R. This rake angle R, as shown most clearly in FIG. 2, is defined between tangent line drawn from the cutting edge 20 relative and a line drawn from the longitudinal axis L of the bit to the cutting edge. In accordance with this feature of the present invention, the rake angle is limited to a range of 20°–26°. Prior drywall bits having a rake angle much larger than this range exhibit faster lineal cutting speeds but at the cost of excessive wear of the router bit. On the other hand, some prior bits having a much lower rake angle are only capable of limited lineal cutting speeds. In accordance with this feature of the present invention, the inventors found that the rake angle of 20°–26° provides the optimum compromise between cutting speed and wear of the flute cutting edge 20.

In yet another aspect of the preferred embodiment of the invention, the helical flute 15 defines a web thickness W along its length as shown in FIG. 2. In accordance with the aspect of the invention, the web thickness W can be related to the outer diameter D (FIG. 1) of the tool. In the most preferred embodiment the web thickness is in the range of 60%–63% of the outer diameter or dimension of the tool. In a specific embodiment, the bit 10 has an outer diameter D of one eighth inch, or 0.125". The web thickness W in this specific embodiment has a value of 0.075"–0.079". Again, it was found that this web thickness or web thickness ratio provides the best balance of cutting speed and strength. Lower web thicknesses in prior drywall bits have led to early breakage, while larger web thickness suffer from a much reduced cutting speed.

It is understood that in accordance with the most preferred embodiment of the invention, all of the features described above are incorporated into a single bit 10. Specifically, the bit 10 has a single flute 15 forming a helix angle H of between 36°–38° and a rake angle R of between 20°–26°. In addition, the flute portion 15 has a web thickness of 0.075–0.079" for a ⅛" diameter bit. In a typical drywall bit according to this specific embodiment, the bit can have an overall length of 2.45", with the tool engaging portion 12 occupying about 1.0" of that length. Preferably, the first flute starts about 0.40" from the point 29 of the tip 14.

Where the bit is intended to perform an axial cut, it can include the chisel S-shaped curvature chisel edges 27 and 28. Alternatively, the tip 14 can assume a variety of configurations, including a flat chisel edge, depending upon the particular application. It should be understood that depending upon the type of application for the bit, one or more of the inventive features can be incorporated into a single bit.

In a typical operation, a routing tool is run at about 30,000 rpm. In a typical residential home, an acceptable useful live of a drywall bit is generally 150 linear feet of cut. This would account for cutting the openings for outlet boxes in about three homes, each having between 40–45 outlet boxes. Alternatively, or in addition, the router bit can be used to cut around window openings. In a typical three bedroom home, seven to nine such windows openings would be cut, which would total the 150 linear feet useful life of the bit. For a typical drywall hanger, maximum user feed rates range between 8–10 feet per minute.

In tests utilizing a drill bit 10 designed in accordance with the specific preferred embodiment, the inventive drill bit out-performed the most common drywall bits in bit speed, smoothness of cut and bit noise. For instance, when compared to one commonly used drywall bit, a prototype bit constructed in accordance with this invention had a maximum cutting speed of nearly twice that of the known prior bit. In addition, the noise associated with operating the inventive bit was 10–15 decimals lower than the prior bit, which is substantially quieter for the drywall hanger.

While the inventive bit did appear to wear faster than the prior bit, this lower bit life would not have a significant impact on the commercial value of the bit. More particularly, as a router bit wears, its cutting speed is reduced. Consequently, although a router bit may actually have a useful life of over 200 lineal feet, the typical drywall hanger will replace the bit at about 150 lineal feet cut. Thus, in comparison to prior router bits, the router bit 10 of the present invention had a comparable commercially usable life. From the perspective of a drywall hanger, this useful life of the inventive bit is more efficient because of the higher cutting speeds that can be achieved by this bit.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A bit for cutting laterally in a drywall or sheetrock panel, comprising:
    an elongated body terminating at one end in a tip for penetrating the panel, said elongated body defining a longitudinal axis; and
    a single helical flute defined on said elongated body, said flute defining a cutting edge at a rake angle relative to said longitudinal axis of between 20 degrees and 26 degrees,
    wherein said tip includes angled chisel edges.

2. A bit for cutting laterally in a drywall or sheetrock panel, comprising:
    an elongated body terminating at one end in a tip for penetrating the panel, said elongated body defining a longitudinal axis; and
    a single helical flute defined on said elongated body, said flute defining a cutting edge at a helix angle relative to said longitudinal axis of between 36 degrees and 38 degrees,
    wherein said cutting edge is defined at a rake angle relative to said longitudinal axis of between 20 degrees and 26 degrees.

3. A bit for cutting laterally in a drywall or sheetrock panel, comprising:
    an elongated body terminating at one end in a tip for penetrating the panel, said elongated body defining a longitudinal axis; and
    a single helical flute defined on said elongated body, said flute defining a cutting edge at a helix angle relative to said longitudinal axis of between 36 degrees and 38 degrees,
    wherein said flute defines an outer diameter and said flute defines a web thickness at said elongated body that is between 60 percent and 63 percent of said outer diameter.

4. The bit according to claim 3, wherein said outer diameter is 0.125 inches and said web thickness is between 0.075–0.079 inches.

5. A bit for cutting laterally in a drywall or sheetrock panel, comprising:
    an elongated body terminating at one end in a tip for penetrating the panel, said elongated body defining a longitudinal axis; and
    a single helical flute defined on said elongated body, said flute defining a cutting edge at a helix angle relative to said longitudinal axis of between 36 degrees and 38 degrees,
    wherein said tip includes angled chisel edges.

6. The bit according to claim 4, wherein said elongated body defines an un-fluted band between said tip and said flute.

7. The bit according to claim 5, wherein said tip is configured for cutting axially into the panel.

8. The bit according to claim 5, wherein said angled chisel edges subtend an angle of between 130° and 123°.

9. The bit according to claim 5, wherein said angled chisel edges define an S-shaped curvature relative to a plane defined by an angle subtended by said angled chisel edges.

10. The bit according to claim 1, wherein said angled chisel edges define an S-shape relative to a plane defined by an angle subtended by said angled chisel edges.

11. A bit for cutting laterally in a drywall or sheetrock panel, comprising:
    an elongated body terminating at one end in a tip for penetrating the panel, said elongated body defining a longitudinal axis; and
    a single helical flute defined on said elongated body, said flute defining a cutting edge at a rake angle relative to said longitudinal axis of between 20 degrees and 26 degrees,
    wherein said flute defines an outer diameter and said flute defines a web thickness at said elongated body that is between 60 percent and 63 percent of said outer diameter.

12. A bit for cutting laterally in a drywall or sheetrock panel, comprising:
    an elongated body terminating at one end in a tip for penetrating the panel, said elongated body defining a longitudinal axis; and
    a single helical flute defined on said elongated body, said flute defining a cutting edge at a rake angle relative to said longitudinal axis of between 20 degrees and 26 degrees,
    wherein said tip is configured for cutting axially into the panel.

13. The bit according to claim 12, wherein said elongated body defines an un-fluted band between said tip and said flute.

14. The bit according to claim 1, wherein said angled chisel edges subtend an angle of between 113° and 123°.

* * * * *

UNITED STATES PATENT AND TRADEMARK OFFICE
CERTIFICATE OF CORRECTION

PATENT NO. : 6,758,639 B2
APPLICATION NO. : 10/072322
DATED : July 6, 2004
INVENTOR(S) : Carl W. Risen, Jr.

It is certified that error appears in the above-identified patent and that said Letters Patent is hereby corrected as shown below:

In the claims:
Claim 8, line 2 (col. 6, line 21): Replace "between 130° and 123°" with -- between 113° and 123° --

Signed and Sealed this

Thirteenth Day of October, 2009

David J. Kappos
*Director of the United States Patent and Trademark Office*